(No Model.)

F. C. WESTON.
BICYCLE LANTERN HOLDER.

No. 511,982. Patented Jan. 2, 1894.

WITNESSES.
J. M. Dolan.
M. Lynch

INVENTOR.
Frank C. Weston
by his atty.
Charles L. Raymond

200
UNITED STATES PATENT OFFICE.

FRANK C. WESTON, OF BANGOR, MAINE.

BICYCLE-LANTERN HOLDER.

SPECIFICATION forming part of Letters Patent No. 511,982, dated January 2, 1894.

Application filed February 4, 1893. Serial No. 461,040. (No model.)

*To all whom it may concern:*

Be it known that I, FRANK C. WESTON, a citizen of the United States, residing at Bangor, in the county of Penobscot, in the State of Maine, have invented a new and useful Improvement in Bicycle-Lantern Holders, of which the following is a full, clear, and exact description, reference being had to the accompanying drawings, forming a part of this specification, in explaining its nature.

It is desirable that a bicycle lantern should not be attached directly to the frame of the bicycle, but rather to a holder which is itself carried by the frame, and which shall act to absorb or otherwise prevent the quick or sharp vibrations of the frame or machine from being transmitted to the lantern. And my invention relates to a lantern holder, which is on the one hand attachable to the bicycle frame, and on the other hand receives and holds the lantern, and which acts to absorb lateral as well as vertical jar, and which comprises a bulb of rubber or other hollow, resilient material suitably formed to receive the necessary attachments or connections. A pneumatic lantern bulb or holder of this character acts to stop or deaden vibration or to convert it from a sharp or sudden movement into one of a slower or lighter character.

The invention also relates to means whereby the angle of the lantern in relation to its holder may be varied at will.

Figure 1:
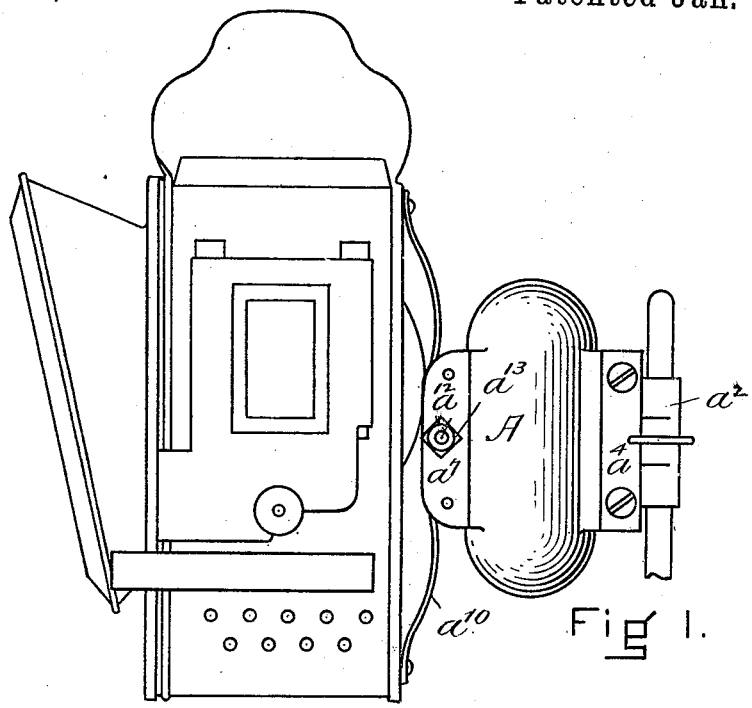
Figure 2:
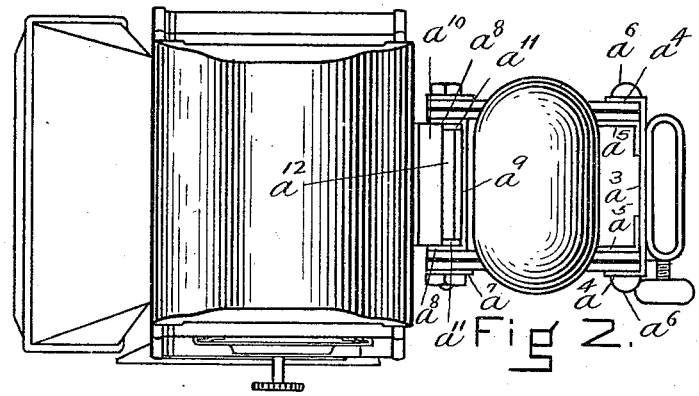
Figure 3:
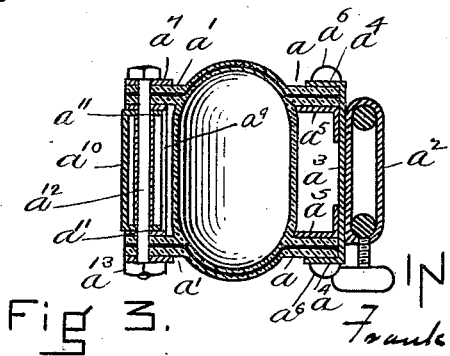

Referring to the drawings: Figure 1 is a view in elevation of the lantern holder having the features of my invention. Fig. 2 is a view in plan thereof. Fig. 3 is a view in horizontal section.

The lantern holder A is preferably made in the form of a hollow substantially rectangular case, its edges and corners being somewhat rounded. It has upon what may be termed its rear side the integral flanges $a$ and upon its front side the integral flanges $a'$. These flanges $a$ $a'$ are preferably in line with each other and with the sides of the holder. The flanges $a$ have attached to them a socket $a^2$ to fit a holding arm or stud on the bicycle frame. This socket is attached to a metal plate $a^3$ which is formed with the bent end sections $a^4$ to lap upon the outer edges of the flanges $a$, to which and to the edges of the combined metal stays and washers $a^5$, they are riveted or bolted by rivets or bolts $a^6$. The plates $a^5$ bear against the inner surface of the flanges $a$ and also against the plate $a^3$. The flanges $a'$ have upon their outer surfaces the metal plates $a^7$, and upon their inner surfaces the metal plates $a^8$, which preferably are connected by the integral connecting plate $a^9$, and the flanges are attached to the lantern frame by means of the plate $a^{10}$ fastened to the lantern back, having inward extensions $a^{11}$, which extend between the plates $a^8$, and with them serve as a hinge or joint by which the angle of the lantern in relation to its holder may be varied at will. The plates or sections $a^{11}$ are clamped between the flanges $a'$ by means of the clamping bolt $a^{12}$ which extends through the plates $a^7$ $a^8$ $a^{11}$ and the flanges, and which is headed at one end, and has the tightening nut $a^{13}$ at the other. The flanges may have incorporated or vulcanized in them metal plates or strips of duck, canvas or other stiffening or strengthening material, and the holder or case may be lined on its interior or exterior or have inserted in its body fibrous material like duck, or canvas to strengthen it.

The holder may be air-tight or not, as desired, and its shape may be varied, and the manner of attaching it to the lantern frame and bicycle frame may be changed without departing from the spirit of the invention.

The holder may of course be employed for attaching a lantern to a tricycle or vehicle of any kind.

Having thus fully described my invention, I claim and desire to secure by Letters Patent of the United States—

1. A bicycle lantern holder comprising a hollow case or bulb of resilient material, having means for attachment to a bicycle frame, and adapted to hold and support the lantern, interposed between the bicycle frame and the lantern, and furnishing the sole means for supporting and holding the same, as and for the purposes described.

2. The combination of a lantern holder, comprising a hollow case or bulb A of resilient material, furnishing the sole means for supporting and holding the lantern, a lantern carried by said hollow case or bulb, and an intermediate adjusting device of the character specified between the lantern and the bulb for varying the angular position of the lantern in relation to its holder, as and for the purposes described.

3. The lantern holder comprising a hollow case or bulb of resilient material, the flanges $a$ upon one side and $a'$ upon the other, the socket $a^2$ secured to the flanges $a$ by the plate $a^3$, the lantern hinge or frame secured to the flanges $a'$ as and for the purposes described.

FRANK C. WESTON.

In presence of—
F. F. RAYMOND, 2d,
J. M. DOLAN.